(12) United States Patent
Bar-Erez et al.

(10) Patent No.: US 7,045,033 B2
(45) Date of Patent: May 16, 2006

(54) METHOD FOR FACILITATING THE REMOVAL OF RESIDUES FROM A THREE-DIMENSIONAL OBJECT FORMED FROM MULTIPLE LAYERS

(75) Inventors: Yossi Bar-Erez, Kfar Sirkin (IL); Eyal Bar-Erez, Kfar-Sirkin (IL)

(73) Assignee: Solidmension Ltd., Beirot Itzhak (IL)

( * ) Notice: Subject to any disclaimer, the term of this patent is extended or adjusted under 35 U.S.C. 154(b) by 39 days.

(21) Appl. No.: 10/611,900

(22) Filed: Jul. 3, 2003

(65) Prior Publication Data

US 2004/0045661 A1    Mar. 11, 2004

Related U.S. Application Data

(63) Continuation of application No. 09/588,383, filed on Jun. 7, 2000, now Pat. No. 6,602,377.

(60) Provisional application No. 60/164,273, filed on Nov. 9, 1999.

(51) Int. Cl.
*B32B 37/12* (2006.01)

(52) U.S. Cl. ............... 156/256; 156/255; 156/264; 156/291; 156/292

(58) Field of Classification Search ............ 156/256, 156/264, 267, 512, 290, 291, 344, 584, 255, 156/292; 206/233, 494; 221/47, 48
See application file for complete search history.

(56) References Cited

U.S. PATENT DOCUMENTS

| | | | |
|---|---|---|---|
| 3,932,923 A | 1/1976 | DiMatteo | |
| 4,699,679 A | 10/1987 | Cartmell et al. | |
| 5,071,503 A | 12/1991 | Berman | |
| 5,520,308 A | 5/1996 | Berg et al. | |
| 5,637,175 A | 6/1997 | Feygin et al. | |
| 5,876,550 A | 3/1999 | Feygin et al. | |
| 6,286,712 B1 | 9/2001 | Craig et al. | |
| 6,602,377 B1 * | 8/2003 | Bar-Erez et al. | 156/264 |

FOREIGN PATENT DOCUMENTS

WO    WO99/34976    7/1999

* cited by examiner

*Primary Examiner*—Linda Gray
(74) *Attorney, Agent, or Firm*—Mark M. Friedman

(57) ABSTRACT

In a system for constructing a three-dimensional object by selective attachment of a plurality of sheets of flexible material, each sheet being cut along at least one contour line so as to subdivide the sheet into at least one object forming region corresponding to the shape of a layer of the object bounded by a corresponding contour of the object and at least one residue region not required in the constructed object, at least part of each object forming region being attached to object forming regions of adjacent layers, a method for facilitating the removal of the residue regions including producing selective attachment of at least part of a plurality of the residue regions to the residue regions of adjacent sheets in such a manner as to form, from at least part of the residue regions of a plurality of the sheets, a plurality of residue elements non-rigidly interconnected such that manual removal of each of the residue elements initiates removal of a subsequent one of the residue elements.

9 Claims, 15 Drawing Sheets

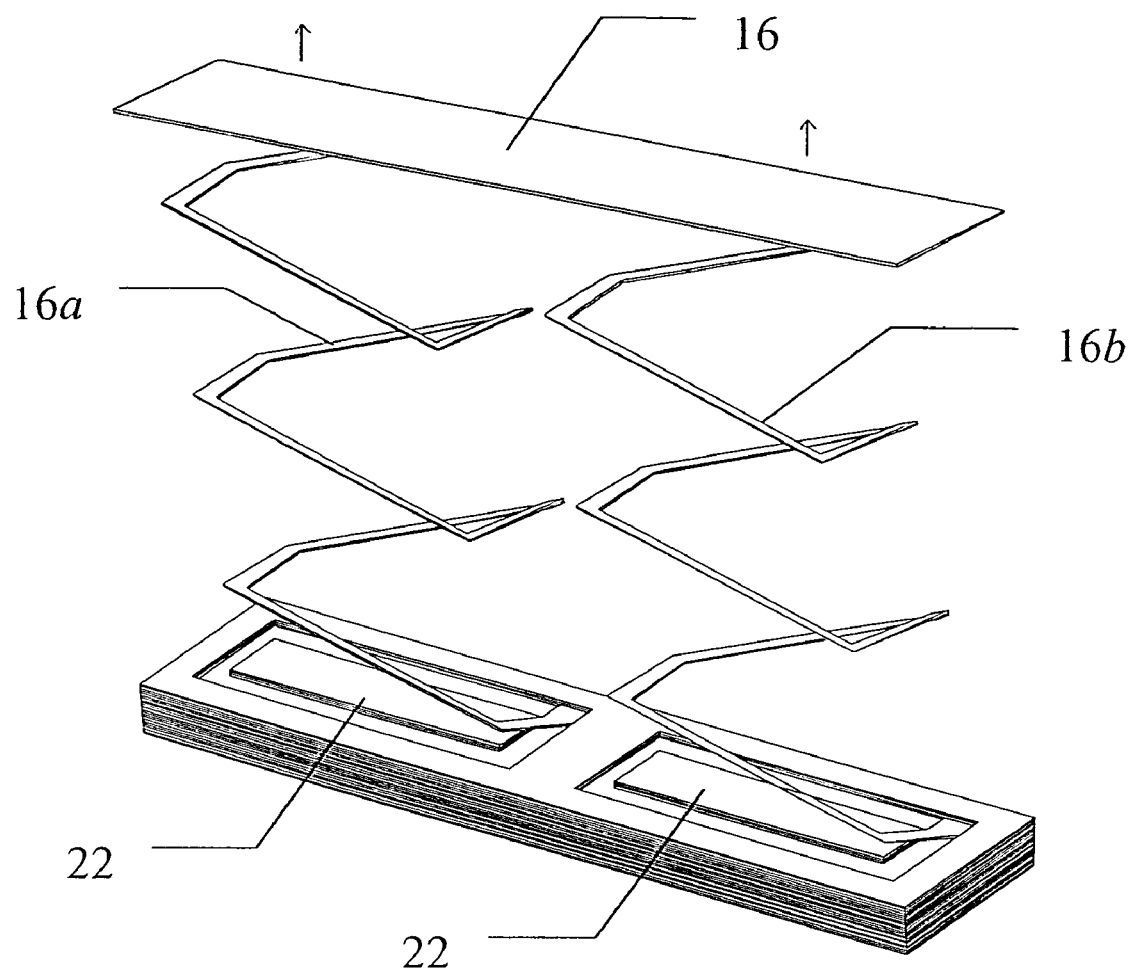

24

24

FIG. 17
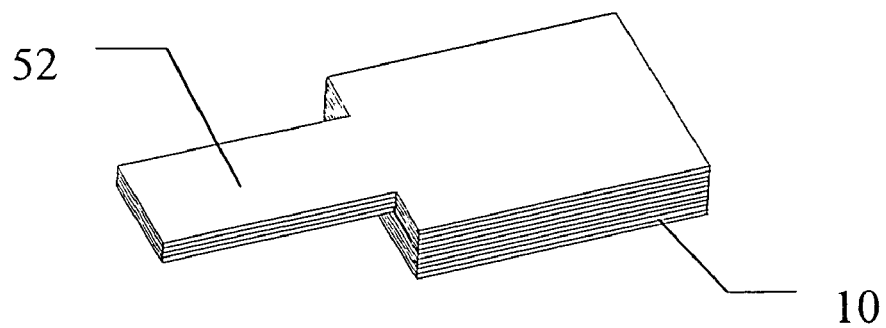
FIG. 18
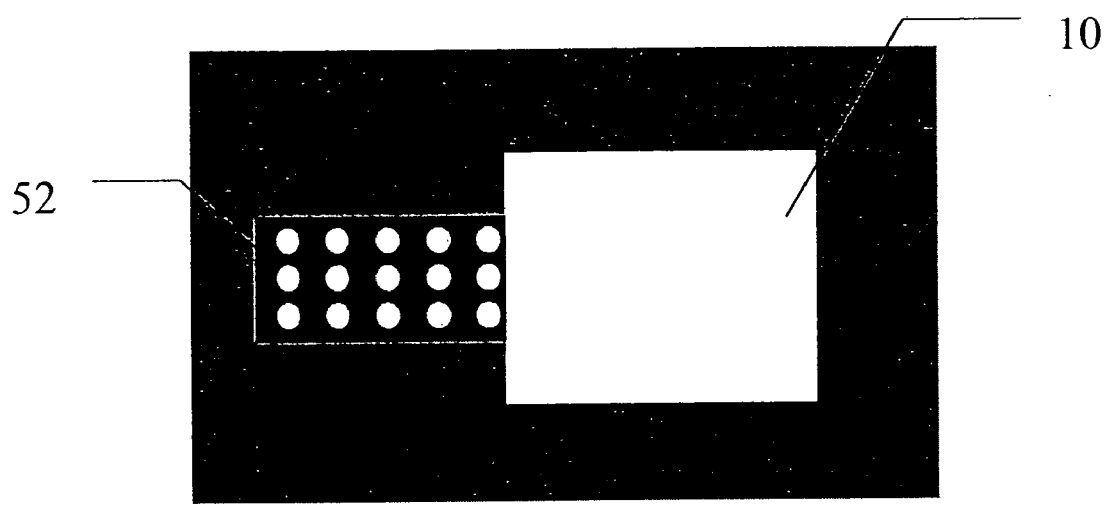
FIG. 19

METHOD FOR FACILITATING THE REMOVAL OF RESIDUES FROM A THREE-DIMENSIONAL OBJECT FORMED FROM MULTIPLE LAYERS

This is a Continuation of U.S. patent application Ser. No. 09/588,383 filed on Jun. 7, 2000, now U.S. Pat. No. 6,602,377, which claims benefit of 60/164,273 filed Nov. 9, 1999.

FIELD AND BACKGROUND OF THE INVENTION

The present invention relates to construction of three-dimensional objects from multiple layers of sheet material and, in particular, it concerns a method for facilitating the removal of residues from adjacent to such objects.

It is known to build-up three-dimensional structures by attaching together layers of sheet material each cut to the contour of a thin slice of the object. This technique can be used in a wide range of applications, and has particular advantages for rapid construction of small numbers of individual prototypes and models using CAD (computer-aided-design) techniques, or to facilitate the manufacture of three-dimensional objects using CAM (computer-aided-manufacture) techniques. An example of this technique is described in U.S. Pat. No. 3,932,923 to DiMatteo. In most implementations of this technique, the individual layers are first contoured, and then the contoured layers are stacked and bonded together to form the three-dimensional object. This tends to lead to low precision due to registration problems in alignment of the pre-contoured layers.

U.S. Pat. No. 5,071,503 to Berman proposes an alternative approach in which each layer is bonded to the partially-built three-dimensional object by selective application of adhesive and only then is contoured to the required shape. Contouring after bonding of the layer increases the precision by avoiding registration problems. PCT Patent Publication No. WO99/34976 proposes a technique for forming three-dimensional structures of this type employing sheets of polymer materials coated on one side with adhesive, such as are commonly used for laminating applications and the like. Selective adhesion of the layers is achieved by applying a releasing agent to prevent adhesion in regions lying outside the contour of the object to be formed.

While the construction of three-dimensional objects is achieved very effectively by selective adhesion and cutting to shape of sheet material, the removal of the unwanted residues around the object can be problematic. If the residues were to be adhered to each other, large blocks would be formed which, depending upon the shape of the object, would be very difficult or impossible to remove. To avoid such problems, commercial devices based on this technology typically perform selective adhesion so that the layers are attached exclusively within the contours of the object. As a result, the object is typically surrounded and/or filled with very numerous separate sheets of residue material which must then be removed manually. This can be a very laborious and time-consuming job.

An alternative approach is proposed by U.S. Pat. No. 5,637,175 to Feygin et al. in which the residue regions are attached to the adjacent sheets but are cut in a cross-hatched fashion to weaken them. This is said to result in a matrix structure which is attached to the object but relatively weak in strength, so that it can be removed by mechanical means. This clearly adds an additional non-trivial production step.

There is therefore a need for a method for facilitating the removal of residues from adjacent to a three-dimensional object formed from attachment of multiple layers of a sheet material.

SUMMARY OF THE INVENTION

The present invention is a method for facilitating the removal of residues from adjacent to a three-dimensional object formed from attachment of multiple layers of a sheet material.

According to the teachings of the present invention there is provided, in a system for constructing a three-dimensional object by selective attachment of a plurality of sheets of flexible material, each sheet being cut along at least one contour line so as to subdivide the sheet into at least one object forming region corresponding to the shape of a layer of the object bounded by a corresponding contour of the object and at least one residue region not required in the constructed object, at least part of each object forming region being attached to object forming regions of adjacent layers, a method for facilitating the removal of the residue regions comprising producing selective attachment of at least part of a plurality of the residue regions to the residue regions of adjacent sheets in such a manner as to form, from at least part of the residue regions of a plurality of the sheets, a plurality of residue elements non-rigidly interconnected such that manual removal of each of the residue elements initiates removal of a subsequent one of the residue elements.

According to a further feature of the present invention, a plurality of the residue regions of at least some of the sheets are selectively cut along at least one separation line.

According to a further feature of the present invention, the separation lines and the selective attachment are configured such that the residue elements circumscribe a residue block such that, after removal of the residue elements, the residue block is readily removable.

According to a further feature of the present invention, each one of at least a first group of the residue elements assumes a generally flat form extending substantially parallel to the sheets.

According to a further feature of the present invention, the selective attachment is configured such that each one of the first group of residue elements is formed from a plurality of the residue regions attached to each other over a major part of their area.

According to a further feature of the present invention, the selective attachment is configured such that the first group of residue elements are interconnected in a generally Z-fold arrangement.

According to a further feature of the present invention, the selective attachment is configured such that adjacent ones of the first group of residue elements are interconnected over no more than a third of their area of overlap.

According to a further feature of the present invention, a plurality of the residue regions of at least some of the sheets are selectively cut along at least one separation line, and one of the first group of residue elements has a maximum dimension L as measured parallel to the sheets, the residue element being subdivided by the separation lines into at least one strip, the strip having a maximum transverse dimension W no more than a third of the maximum dimension L.

According to a further feature of the present invention, the strip follows a generally spiral pattern. According to an alternative feature of the present invention, the strip follows a reciprocating scanning pattern.

According to a further feature of the present invention, a plurality of the residue regions of at least some of the sheets are selectively cut along at least one separation line, and wherein each one of at least a second group of the residue elements assumes a generally flat form extending substantially perpendicular to the sheets.

According to a further feature of the present invention, where at least part of the residue regions are within a side-opening of the object, the method further comprises selectively cutting a plurality of the residue regions of at least some of the sheets along at least one separation line, wherein the separation lines and the selective attachment are configured in such a manner as to form from at least part of the residue regions of a plurality of the sheets adjacent to the side opening a handle attached to a plurality of the residue portions which lie within the side opening, the handle being exposed by removal of other portions of the residue regions adjacent to the side opening so as to be readily accessible for facilitating removal of the residue portions from within the side opening.

There is also provided according to the teachings of the present invention, in a system for constructing a three-dimensional object by selective attachment of a plurality of sheets of flexible material, each sheet being cut along at least one contour line so as to subdivide the sheet into at least one object forming region corresponding to the shape of a layer of the object bounded by a corresponding contour of the object and at least one residue region not required in the constructed object, at least part of each object forming region being attached to object forming regions of adjacent layers, a method for facilitating the removal of the residue regions comprising: (a) selectively cutting a plurality of the residue regions of at least some of the sheets along at least one separation line; and (b) producing selective attachment of at least part of a plurality of the residue regions to the residue regions of adjacent sheets, the separation lines and the selective attachment being configured in such a manner as to form, from at least part of the residue regions of a plurality of the sheets, a plurality of residue elements non-rigidly interconnected such that manual removal of each of the residue elements initiates removal of a subsequent one of the residue elements.

According to a further feature of the present invention, the separation lines and the selective attachment are configured such that the residue elements circumscribe a residue block such that, after removal of the residue elements, the residue block is readily removable.

There is also provided according to the teachings of the present invention, in a system for constructing a three-dimensional object by selective attachment of a plurality of sheets of flexible material, each sheet being cut along at least one contour line so as to subdivide the sheet into at least one object forming region corresponding to the shape of a layer of the object bounded by a corresponding contour of the object and at least one residue region not required in the constructed object, at least part of each object forming region being attached to object forming regions of adjacent layers, a method for facilitating the removal of the residue regions from a side-opening of the object comprising: (a) selectively cutting a plurality of the residue regions of at least some of the sheets along at least one separation line; and (b) producing selective attachment at least part of a plurality of the residue regions to the residue regions of adjacent sheets, the separation lines and the selective attachment being configured in such a manner as to form from at least part of the residue regions of a plurality of the sheets adjacent to the side opening a handle attached to a plurality of the residue portions which lie within the side opening, the handle being exposed by removal of other portions of the residue regions adjacent to the side opening so as to be readily accessible for facilitating removal of the residue portions from within the side opening.

BRIEF DESCRIPTION OF THE DRAWINGS

The invention is herein described, by way of example only, with reference to the accompanying drawings, wherein:

FIG. 7 is a schematic isometric view illustrating the removal of residue material from a block containing a three-dimensional object and residue elements formed according to a sixth aspect of the method of the present invention;

FIG. 17 is a schematic isometric view of a three-dimensional object, constructed and operative according to the teachings of the present invention, having a flexible portion;

FIG. 18 is a plan view of a sheet used for constructing the object of FIG. 17, showing a first distribution of a releasing agent according to the present invention to provide enhanced flexibility of the flexible portion; and FIG. 19 is a plan view of a sheet used for constructing the object of FIG. 17, showing a second distribution of a releasing agent according to the present invention to provide enhanced flexibility of the flexible portion.

DESCRIPTION OF THE PREFERRED EMBODIMENTS

Figure 1:
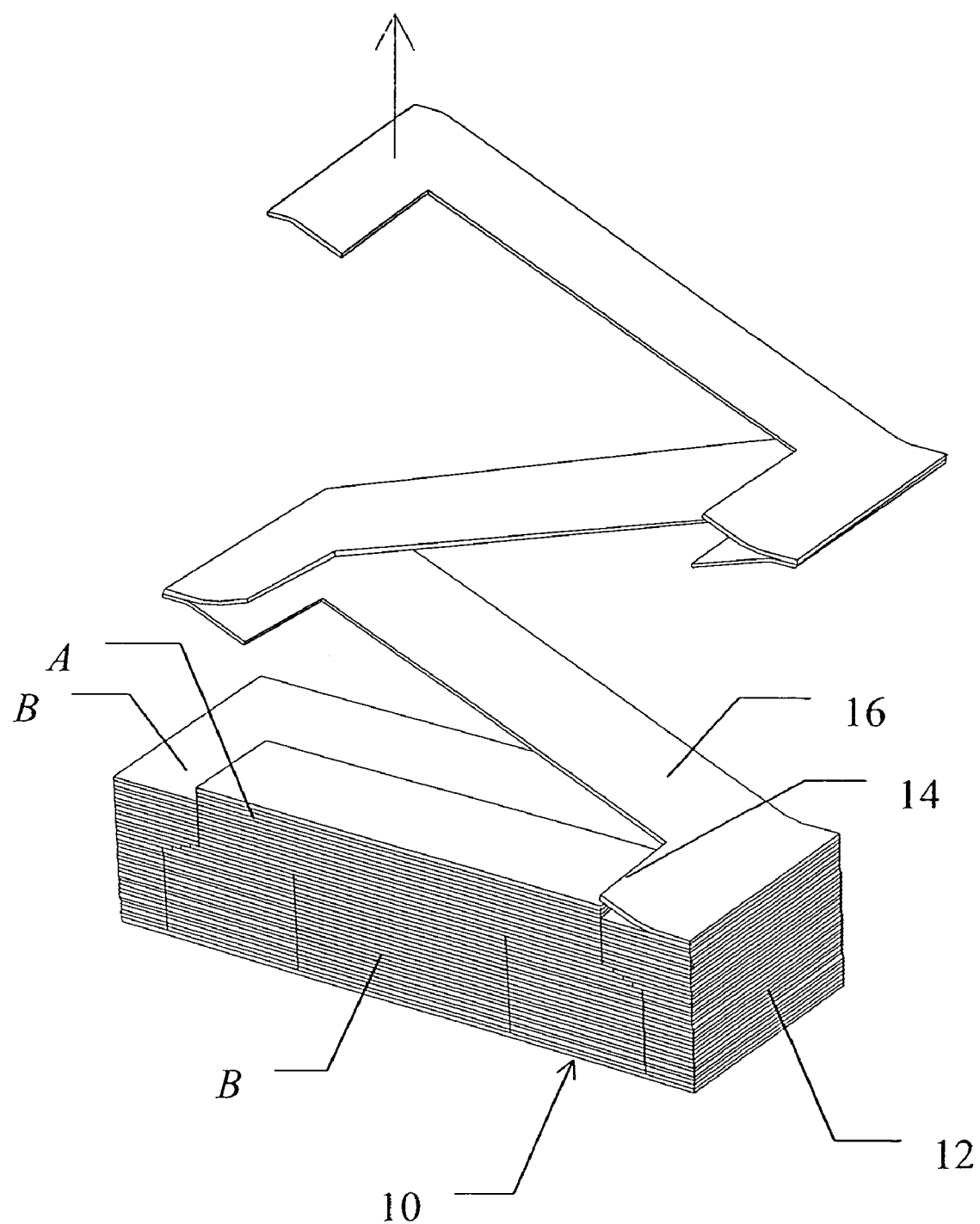
FIG. 1 is a schematic isometric view illustrating the removal of residue material from a block containing a three-dimensional object and residue elements formed according to a first aspect of the method of the present invention.

The present invention is a method for facilitating the removal of residues from adjacent to a three-dimensional object formed from attachment of multiple layers of a sheet material.

The principles and operation of methods according to the present invention may be better understood with reference to the drawings and the accompanying description.

Referring now to the drawings, FIGS. 1–13 show a number of structures including a three-dimensional object at least partially surrounded by residue material illustrating a number of aspects of the present invention.

As stated above, the invention relates to systems for constructing three-dimensional objects 10 by selective attachment of a plurality of sheets 12 of flexible material. In such systems, each sheet 12 is cut along at least one contour line 14 so as to subdivide the sheet into at least one object forming region A corresponding to the shape of a layer of the object bounded by a corresponding contour of the object and at least one residue region B not required in the constructed object. At least part of each object forming region A is attached to object forming regions A of adjacent layers. The technique for achieving this selective attachment, including the choice of glue and the method for localizing adhesion to the desired regions, are generally not critical to the residue removal aspect of the present invention.

In general terms, the method of the present invention facilitates removal of the residue regions B in such a system by producing selective attachment at least part of a plurality of the residue regions B to the residue regions B of adjacent sheets 12. The selective attachment is configured in such a manner as to form, from at least part of the residue regions of a plurality of the sheets, a plurality of residue elements 16 non-rigidly interconnected such that manual removal of each of the residue elements initiates removal of a subsequent one of the residue elements.

It will be readily apparent that the method of the present invention provides a particularly simple and effective solution to the above-mentioned problems associated with removal of residues. Since the residue elements 16 are separate over a majority of their area, they are easily removed from around the object. At the same time, the interconnection of the residue elements facilitates their rapid and efficient sequential removal, drawn one after the other much like successive links of a chain, or a continuous long strip or string. This and other features of the present invention will become clearer from the following detailed description.

Before addressing the features of the invention in more detail, it will be useful to define certain terminology as used herein in the description and claims. Firstly, reference will be made to planes and directions parallel to, or perpendicular to, sheets 12. While it is understood that any sheet of material has a finite thickness and therefore does not truly define a plane, it is clear that a sheet of which the thickness is at least two orders of magnitude smaller than its length or width may, when lying flat, be taken to define a plane for most practical purposes. Should more precision be required, the plane in question is to be defined as the plane coincident with the upward-facing surface of the sheet.

For convenience of description, it is assumed that object 10 is formed from sheets 16 disposed horizontally, and that a direction perpendicular to the sheets is therefore vertical. It will be clear, however, that the invention is in no way dependent upon the orientation at which it is practiced.

Turning now to the features of the present invention in more detail, in a simplest implementation, some of the advantageous properties of the method of the present invention can be obtained by producing one or more randomly located point of attachment between successive overlapping residue regions. In preferred implementations, however, one or more selected pattern of attachment is chosen in a manner to facilitate removal of successive residue elements for a given object structure.

By way of a first example, FIG. 1 shows a first preferred aspect of the present invention according to which residue elements 16 assume a generally flat form extending substantially parallel to the sheets and interconnected in a generally Z-fold arrangement. The term Z-fold in this context is used to refer to any configuration in which the region of connection between successive elements alternates between two different regions removed from each other such that the first region serves as the trailing portion of a first element and a leading portion of a second element and the second region serves as the trailing portion of the second element and the leading portion of the third element. In the case of approximately rectangular elements attached at alternating ends, this generates a structure which gives the appearance of being alternately folded on itself, hence the name "Z-fold". It should be appreciated, however, that the Z-folds of the present invention are not generally symmetrical, often varying in shape and dimensions between successive elements, depending upon the shape of the object being constructed. Furthermore, the regions of connection are not necessarily at the extreme edges of the elements in any given dimension.

In the specific example shown here, the elements are connected at alternating ends of the length of the residue elements. The size of the area of attachment is determined by the strength and weight of the sheet material and of the bonding technique used. The area of attachment is preferably less than a third of the area of overlap in order to provide the required flexibility of connection between the residue elements. Typically, no more than a few percent of the area of overlap need be attached.

The details of how to produce the required form of attachment are clearly a function of the techniques used. In general terms, however, they parallel the techniques used for producing selective attachment within the object outline. Thus, where selective application of adhesive is used, adhesive will also be applied at the opposite ends of adjacent sheets serving as the surface of the residue elements. In a preferred example, the releasing agent based approach described in the aforementioned PCT Patent Publication No. WO99/34976 is used. In this case, a releasing agent is applied to all regions of the residue element where no adhesion is desired.

It should be appreciated that the residue elements 16 need not necessarily be single sheets 12. In fact, it is generally preferred to configure the selective attachment of residue regions such that each residue element 16 is formed from a plurality of the residue regions attached to each other over a major part of their area. In this way, multiple layers are removed simultaneously, rendering the removal procedure more efficient. The attachment of multiple layers also particular advantages in the context of the preferred releasing agent based implementations due to savings in both the time taken to apply the releasing agent and the quantities of releasing agent required. The number of layers to be attached together to form each residue element is selected according to the thickness of the layers and the degree of flexibility which will be required during removal of the residue (as will be discussed further below). In most cases, each residue element 16 may advantageously be formed from 2–5 layers attached together.

Figure 2:
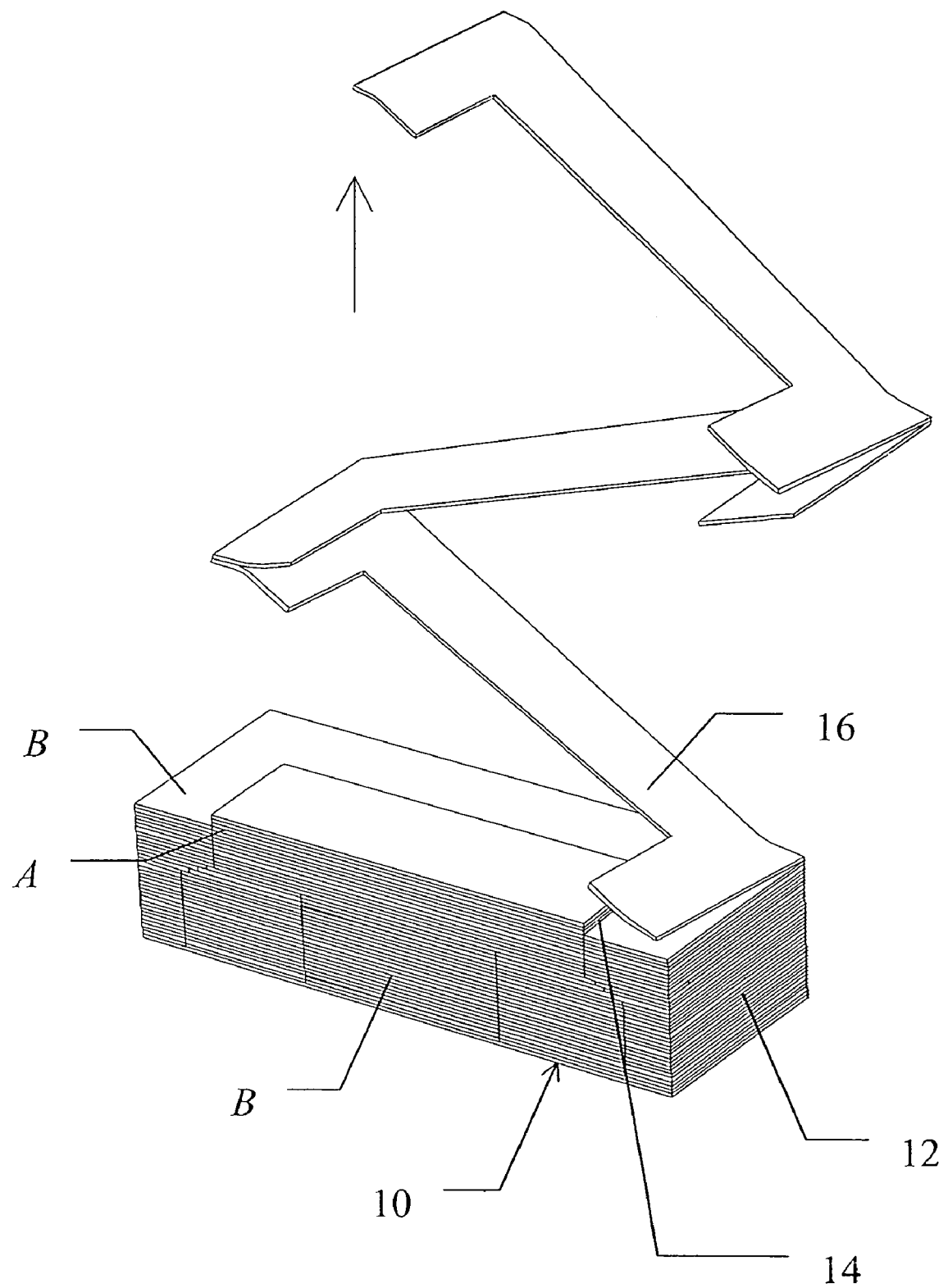
FIG. 2 is a schematic isometric view illustrating the removal of residue material from a block containing a three-dimensional object and residue elements formed according to a second aspect of the method of the present invention.

Turning now to FIG. 2, this shows a variation of the Z-fold configuration of FIG. 1 in which the connection between the residue elements is produced selectively adjacent to corner portions of the elements. This corner connection tends to impart an additional width-ways inclination to each residue element as it is pulled by the element previously removed. This is particularly useful in cases where the Z-fold residue is to be removed from within surrounding material of the three-dimensional object.

While the Z-fold described thus far can, in many cases, be implemented effectively without additional cutting of sheets 12, the present invention also provides a range of methods in which the selective attachment of layers is used to advantage in combination together with selective cutting of at least some of the residue regions along at least one separation line 18. A first set of examples of such methods are shown in FIGS. 3–5.

Figure 3A:
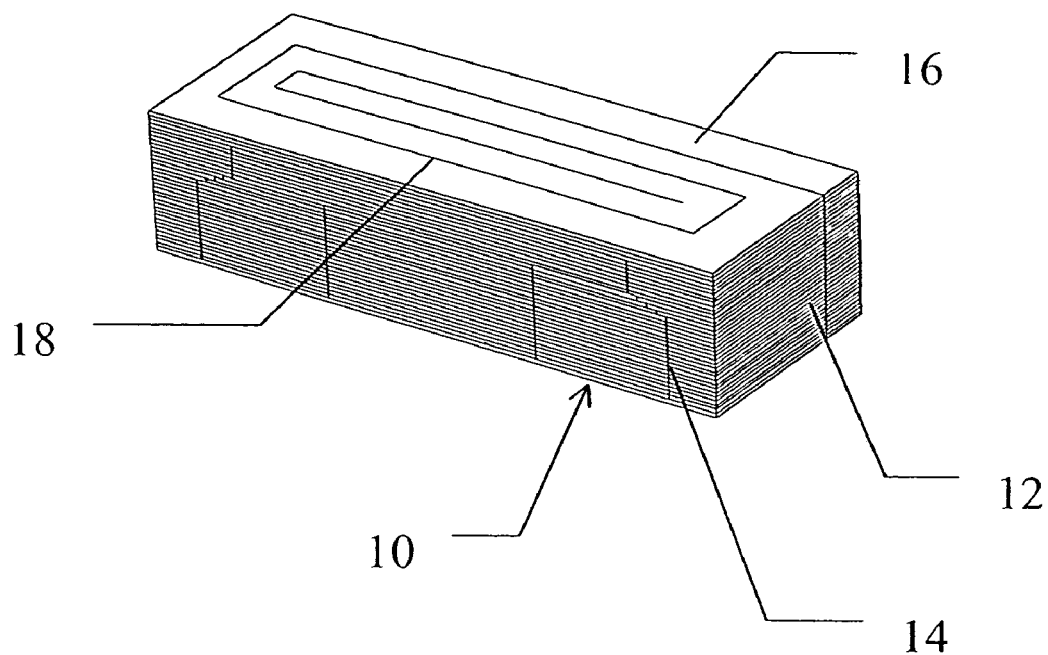
FIGS. 3A and 3B are schematic isometric views illustrating a block containing a three-dimensional object and residue elements formed according to a third aspect of the method of the present invention, prior to and during removal of residue elements, respectively.
Figure 3B:
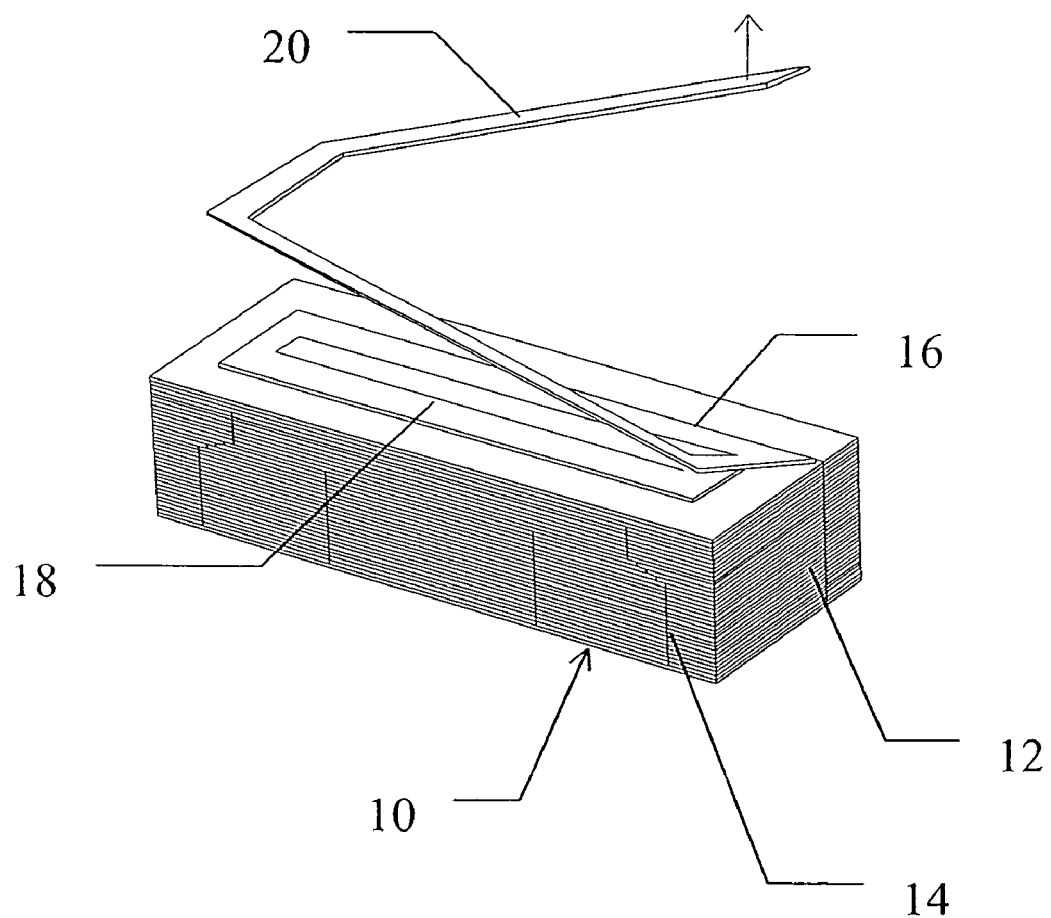

Turning first to FIGS. 3A and 3B, there is shown a set of sheets 12 in which the horizontal residue elements 16 are each subdivided along a separation line into an elongated strip 20 which follows a generally spiral pattern. In this context, the term "spiral" is used to refer to any form which generally progressed from the outer periphery of the residue region to an internal point of termination, or vica versa. Clearly, however, the spiral is not necessarily or even typically circular or symmetrical. Furthermore, in many cases it may be preferable to employ a spiral form defining a variable width strip 20. For example, where the outside of the spiral is adjacent to a wall of the object in such a manner as to provide increased resistance to removal of the residue, it may be advantageous to employ a narrow strip which is more easily removed. In the central portion, on the other hand, efficiency may be improved by using a wider strip width.

In a broad sense, as defined above, this configuration is also viewed as a Z-fold in that attachment between successive residue elements alternates between two regions, namely, the outer and inner extremes of the spiral.

Figure 4A:
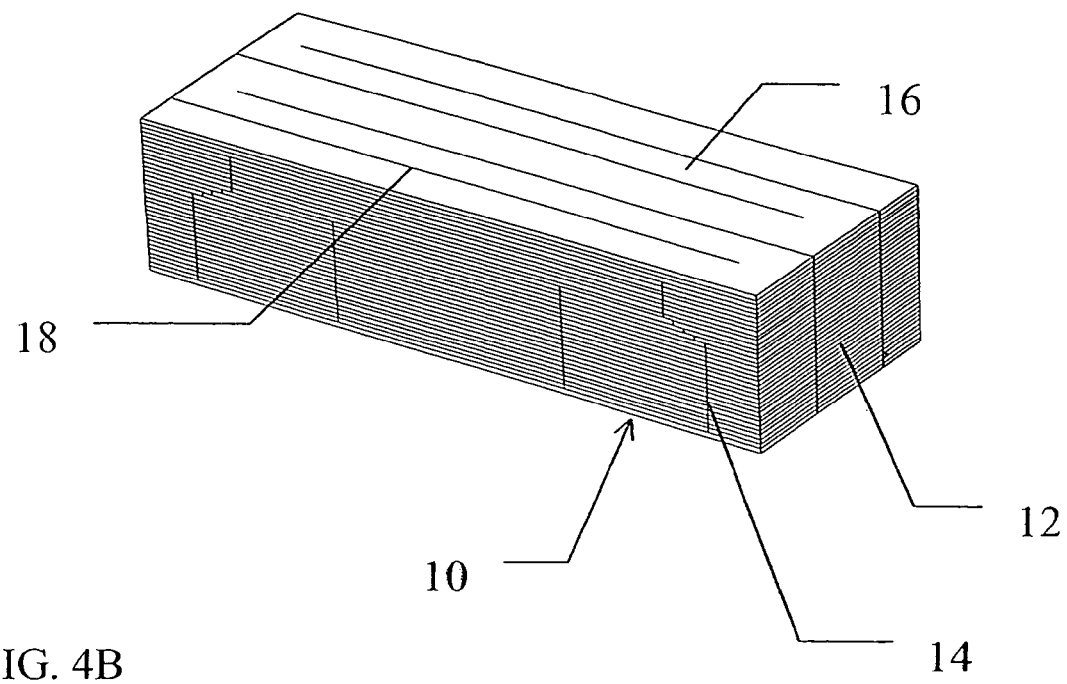
FIGS. 4A and 4B are schematic isometric views illustrating a block containing a three-dimensional object and residue elements formed according to a fourth aspect of the method of the present invention, prior to and during removal of residue elements, respectively.
Figure 4B:
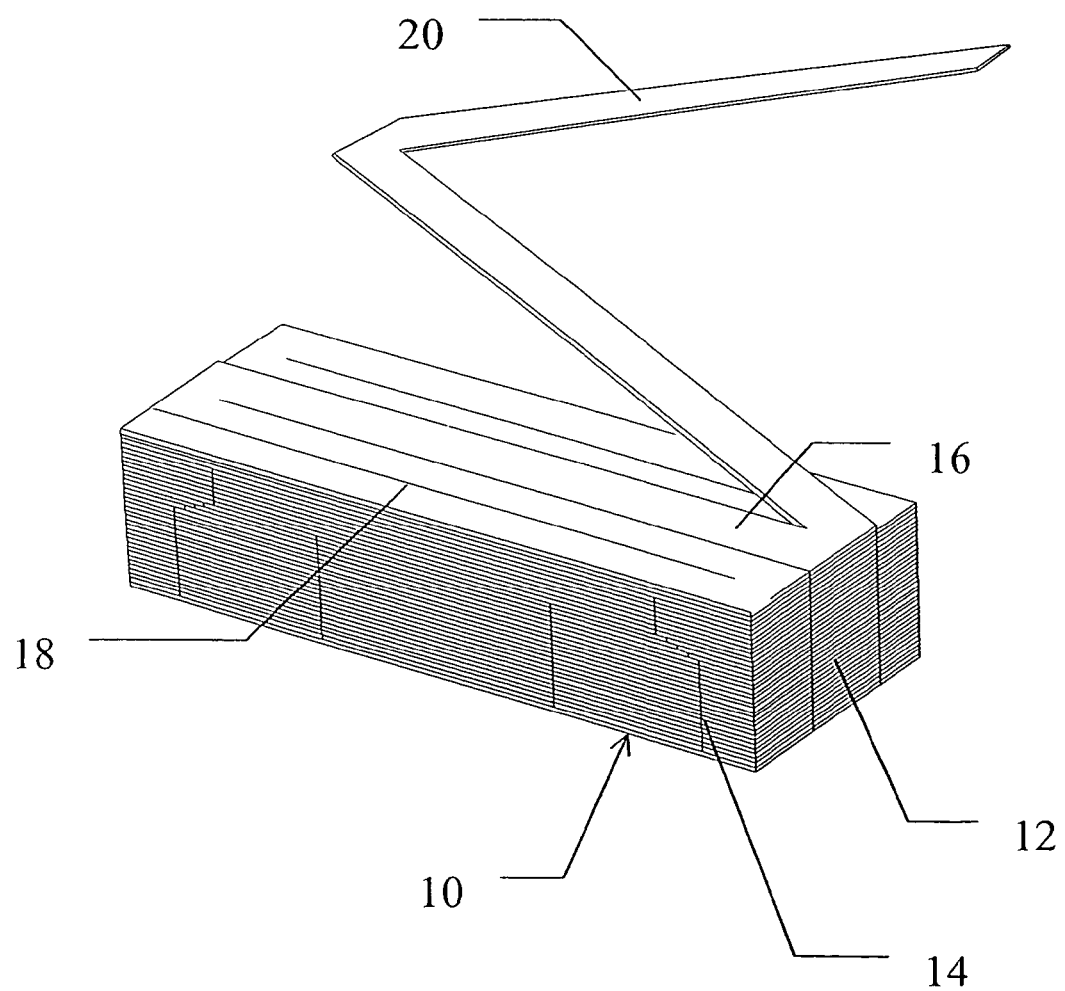
Figure 5:
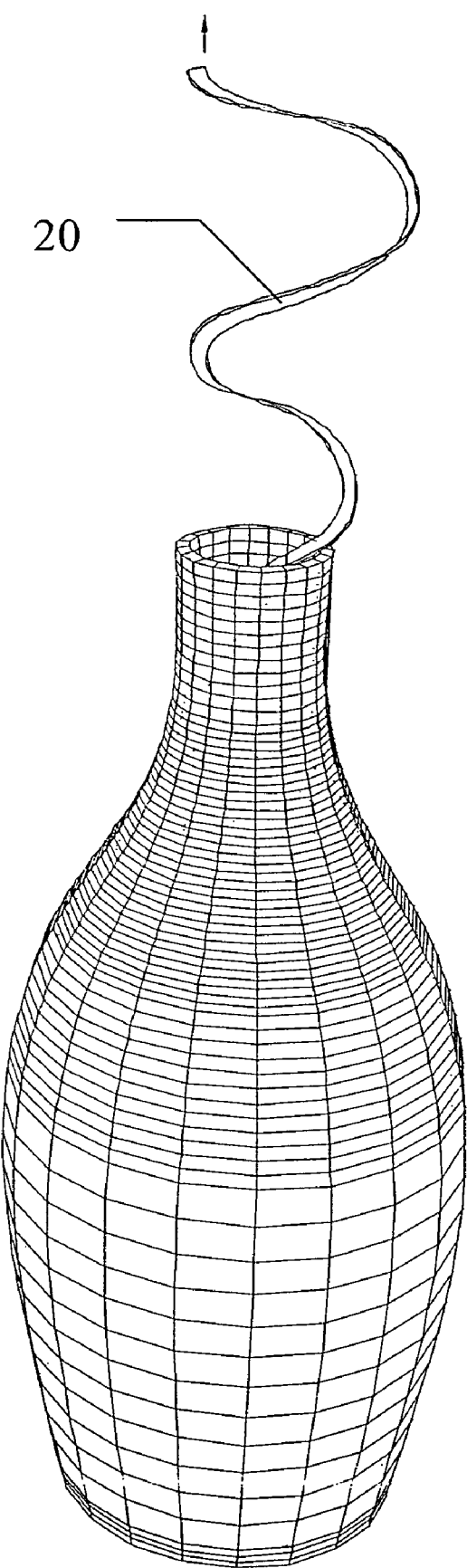
FIG. 5 is a schematic isometric view of a three-dimensional object illustrating the use of the method of the present invention to remove residue material from an internal volume through a relatively small opening.

FIGS. 4A and 4B show an alternative form in which strip 20 follows a reciprocating scanning pattern. The phrase "reciprocating scanning pattern" is used herein to refer to a pattern in which a region is covered by a strip passing backwards and forwards in a first direction across an area in such a manner as to progress across in a perpendicular direction. In other words, the strip follows a path similar to a raster-type scanning motion. Here too, it will be apparent that the shape of the pattern may be non-rectangular, asymmetric and may employ a variable width strip, all as dictated by the specific considerations of a given application.

It is important to note that the configurations of FIGS. 3 and 4 provide effective solutions for various cases which pose almost insurmountable problems for conventional techniques. Specifically, the solutions of FIGS. 3 and 4 allow a volume of residue of substantially unlimited dimensions to be prepared for convenient removal as a long unbroken strip or string of arbitrary width. This allows an internal volume of the object to be removed through a relatively small opening.

By way of a specific example, FIG. 5 shows an object 10 in the form of a bottle from which an inner volume of residue is being removed. In the case shown, the maximum width W of strip 20 is preferably no more than about a third of the maximum transverse dimension L of the horizontal residue elements. The width may advantageously be less than a tenth of L, if so required. Here too, efficiency may optionally be improved by attaching a number of sheets 12 together to form a residue element 16, and hence also strip 20, of increased thickness. The maximum thickness of residue element 16 which can be used depends upon the dimensions of the available opening, as well as the required degree of flexibility to allow the strip to be conveniently drawn out through the opening.

Figure 6:
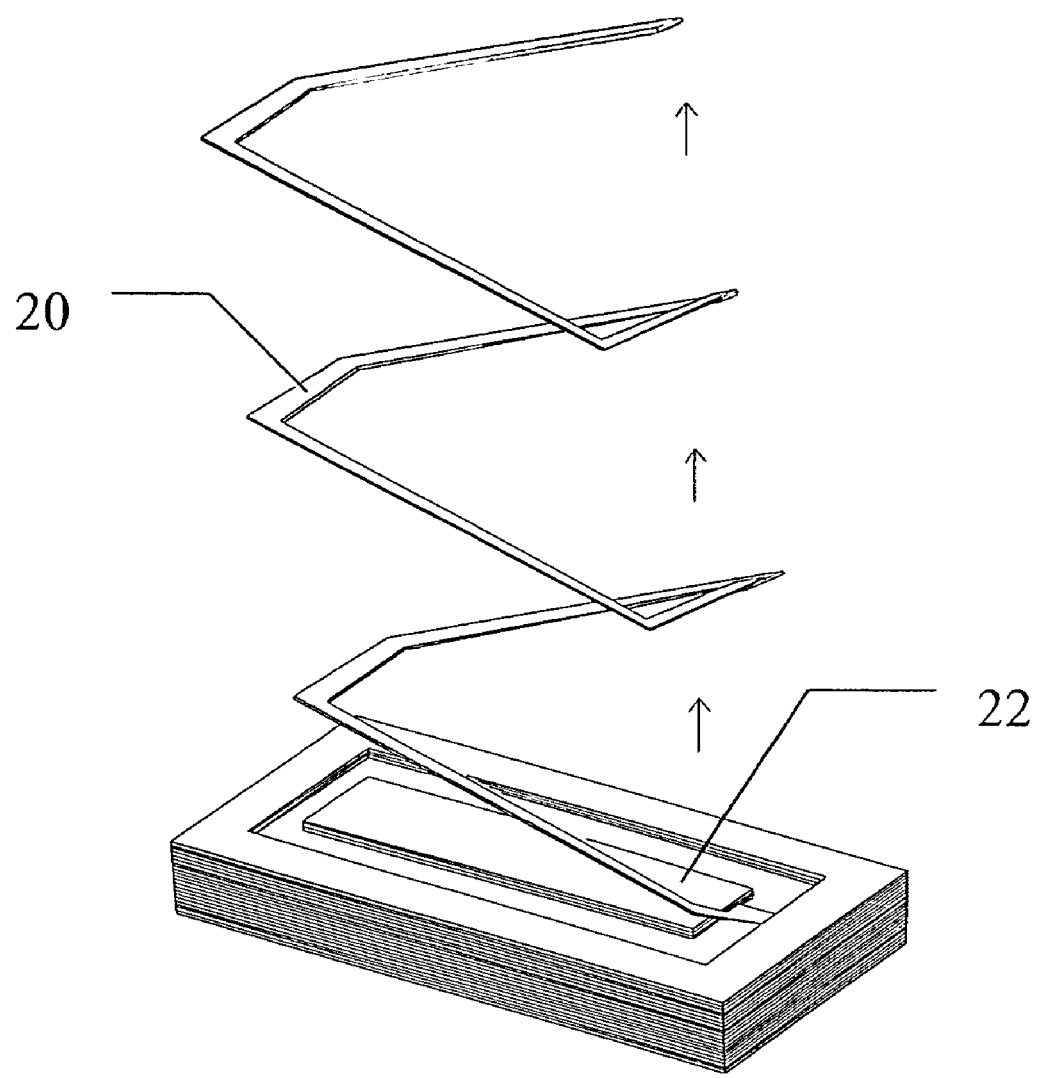
FIG. 6 is a schematic isometric view illustrating the removal of residue material from a block containing a three-dimensional object and residue elements formed according to a fifth aspect of the method of the present invention.

Turning now to FIG. 6, there is shown a further aspect of the present invention according to which separation lines 18 and the selective attachment are configured such that the residue elements 16 circumscribe a residue block 22 such that, after removal of residue elements 16, residue block 22 is readily removable. This configuration again reduces the labor involved in removal of the residues by minimizing the volume which must be drawn out as an elongated strip. Additionally, in the case of the preferred implementation using a releasing agent based system, this configuration provides further advantages due to savings in both the time taken to apply the releasing agent and the quantities of releasing agent required. Clearly the residue block may itself be subdivided into two or more adjacent or spaced-apart blocks.

In the example shown here, residue elements 16 are interconnected as loops of a generally helical pattern circumscribing a single rectangular block. The term "helical" in this context is used to refer to any form which cyclically repeats a closed form in overlapping relation, without any implication of circularity or symmetry.

It should be noted that the various aspects of the present invention described thus far are not mutually exclusive. To the contrary, in many cases, a number of different configurations are preferably combined to optimize the residue removal procedure for a given three-dimensional object. For example, a simple Z-fold may be preferred for large substantially whole sheets for an initial number of layers. Then, when one or more internal cavities are reached, the pattern may switch to a spiral or reciprocating strip.

In many cases, it will be apparent that the number of non-contiguous residue regions changes between successive layers. Where the number decreases, one chain of residue elements typically comes to an end. When, on the other hand, the number of non-contiguous residue regions increases, the separation lines and the selective attachment are preferably configured such that manual removal of a given one of the residue elements initiates removal of a subsequent two or more residue elements. An example of such a configuration is shown in FIG. 7.

Turning now to FIG. 7, there is shown a first residue element 16 which is connected so as to draw after itself two separate series of residue elements 16a and 16b. In the specific example shown here, the separate series are of the type described with reference to FIG. 6 above, although any other of the configurations described above could equally be used.

Figure 8A:
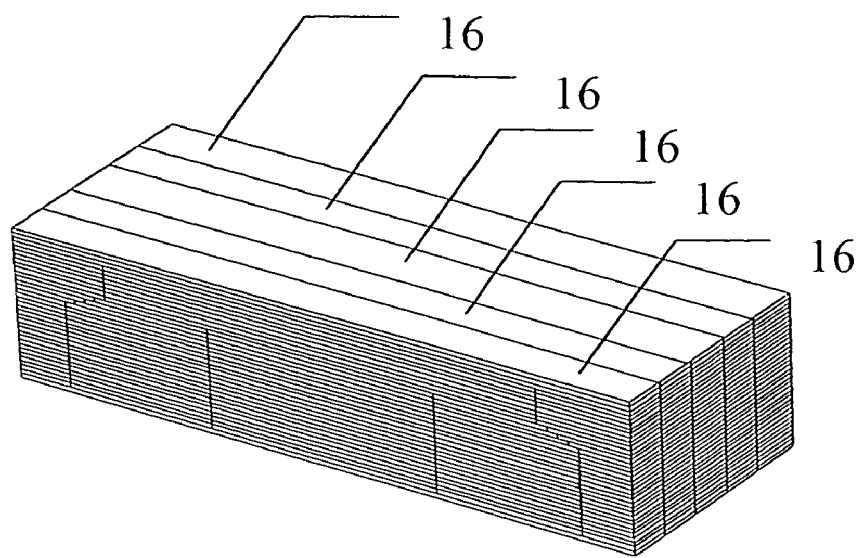
FIGS. 8A and 8B are schematic isometric views illustrating a block containing a three-dimensional object and residue elements formed according to a seventh aspect of the method of the present invention, prior to and during removal of residue elements, respectively.
Figure 8B:
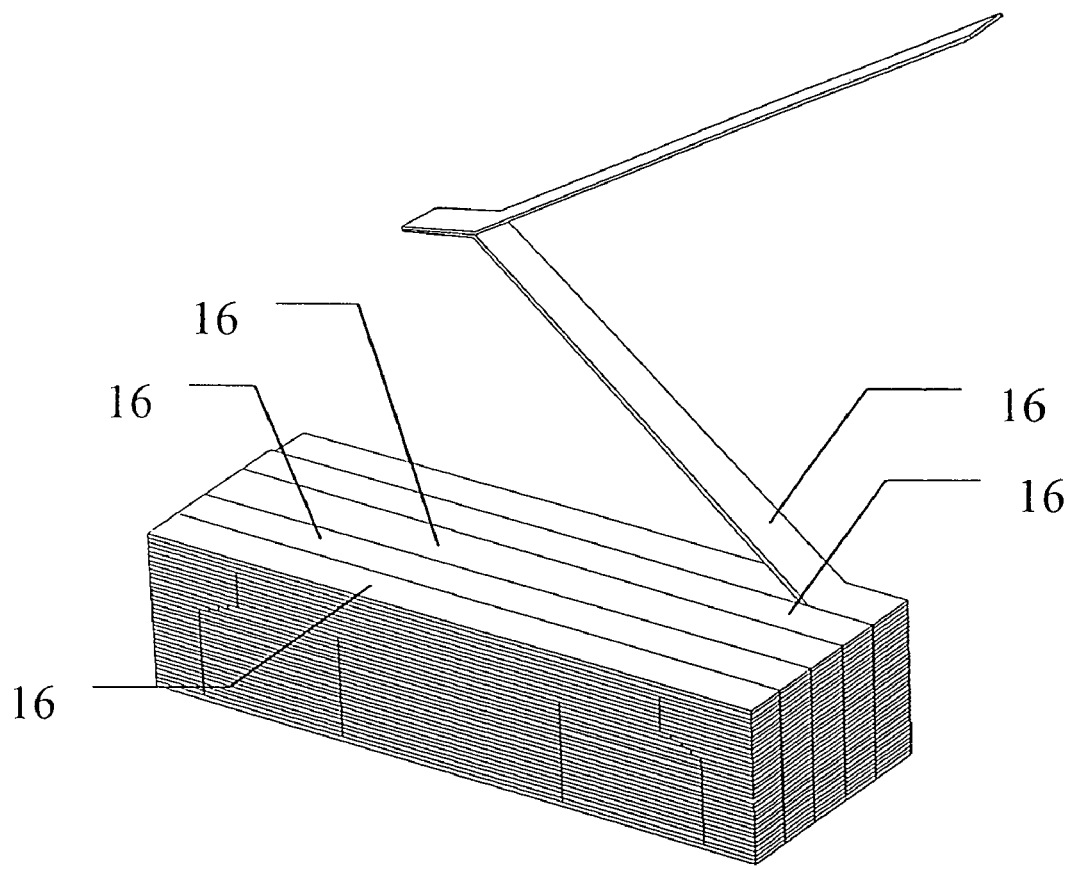
Figure 9A:
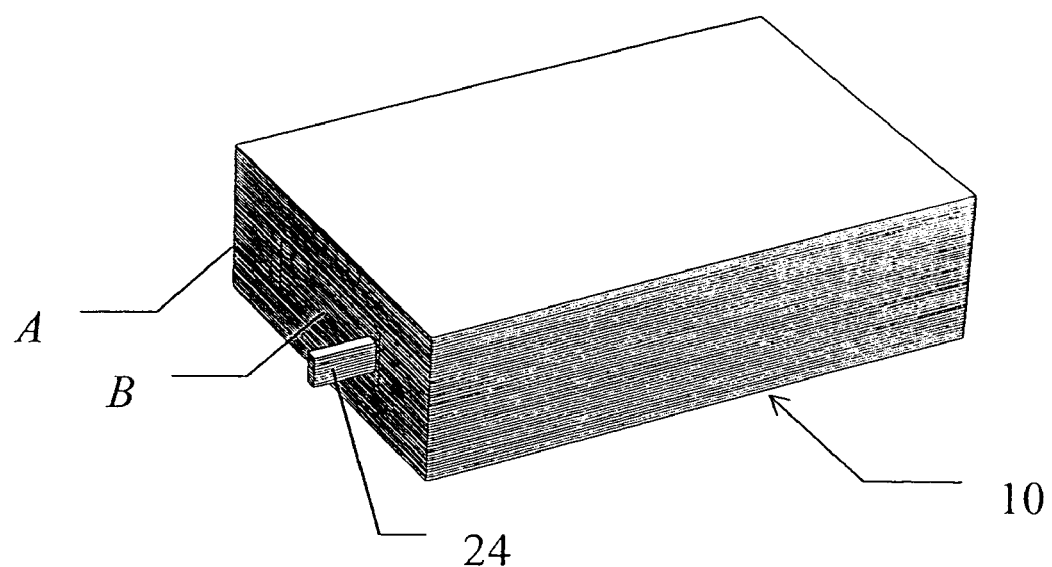
FIGS. 9A and 9B are schematic isometric views illustrating a block containing a three-dimensional object and residue elements formed according to an eighth aspect of the method of the present invention, prior to and during removal of residue elements, respectively.
Figure 9B:
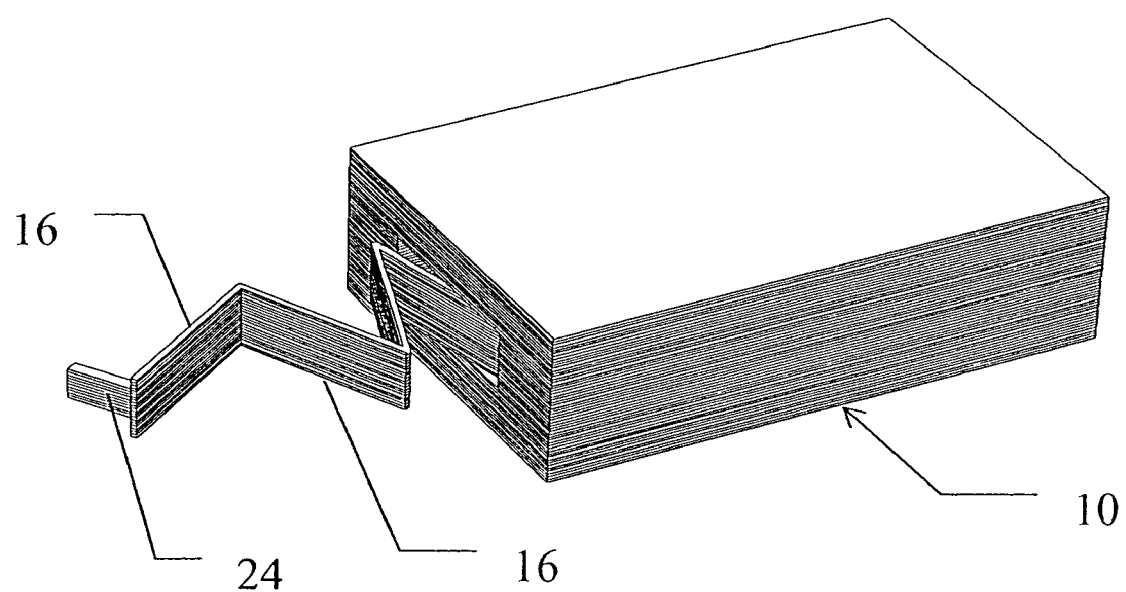
Figure 9C:
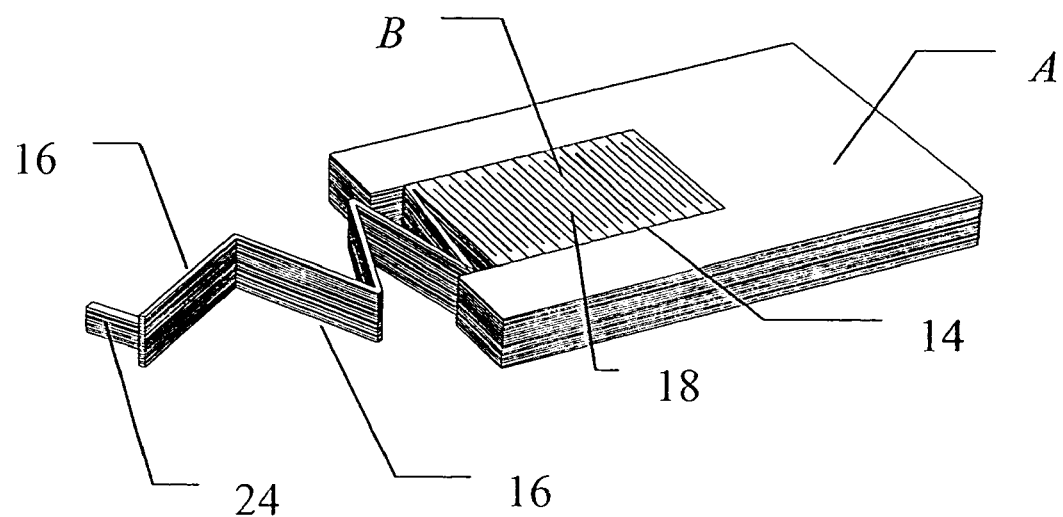
FIG. 9C is a schematic isometric view of a horizontal slice taken through the block of FIG. 9B.

Turning briefly to FIGS. 8A and 8B, it may be noted that optimization of the choice of residue removal configuration can sometimes become computationally heavy. In such cases, the computation can be simplified by subdividing the block into a number of slices, each of which is treated independently with regard to the methods of the present invention. The result is typically a plurality of narrow parallel Z-fold structures of variable length.

The various cases of the method of the present invention discussed thus far are all based upon residue elements 16 which are made up of one or more sheets lying horizontally, i.e., in the plane of the sheets themselves. It should be noted that these techniques, when used to provide easy residue removal from both the top and bottom of the object, are sufficient to allow removal of residues from a wide range of different shaped objects. The main type of structure for which these techniques alone are generally not sufficient is objects having a side-opening, i.e., where residue regions are interposed vertically between layers forming parts of the object. In such cases, combinations of selective attachment and cutting of lines of separation may be used to construct residue elements lying at a full range of non-horizontal angles, or which gradually change angle as they progress, depending upon the specific requirements of each application. By way of example, a number of solutions for side openings using residue elements 16 extending vertically will now be presented with reference to FIGS. 9–12.

Turning now to FIGS. 9–12, these structures conceptually parallel the structures of FIGS. 1–8, but replace the horizontal residue elements of the earlier figures with residue elements extending substantially perpendicular to the sheets. Thus, in the example of FIGS. 9A–9C, a side-opening cavity contains a plurality of residue regions 16, each cut along separation lines 18 in a horizontal zigzag pattern and attached vertically to the adjacent layers. The result, as seen clearly in FIGS. 9B and 9C, is a sideways-opening Z-fold structure in which each residue element 16 is a vertical walls formed from superimposed strips from each of a relatively large number of adjacent layers which are stuck one on top of the other.

Figure 10:
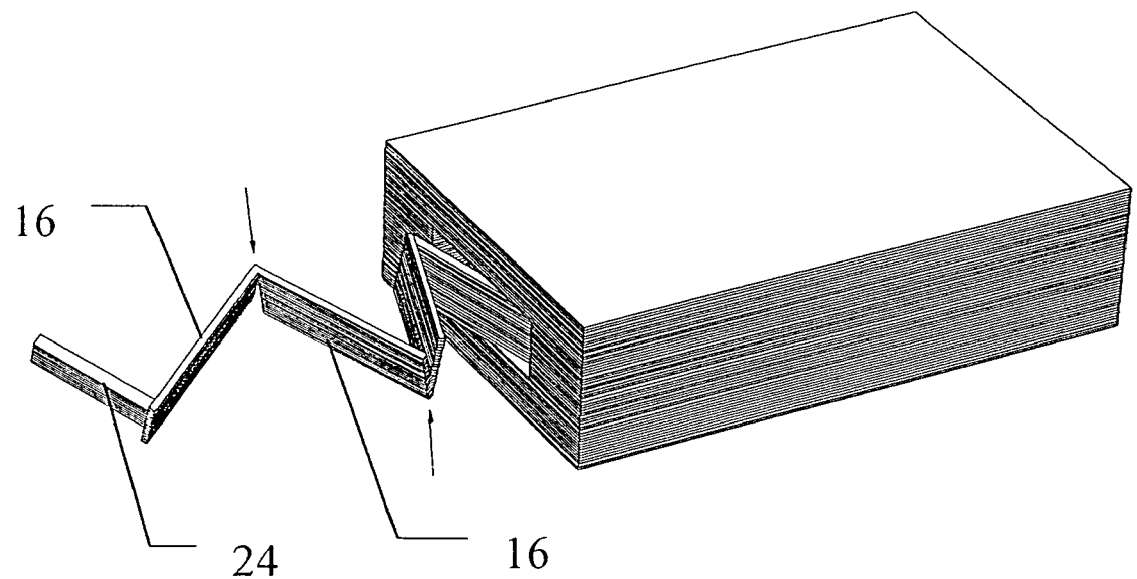
FIG. 10 is an isometric view illustrating the removal of residue material from a block containing a three-dimensional object and residue elements formed according to a ninth aspect of the method of the present invention.

FIG. 10 shows a similar configuration in which connections are made only adjacent to the corner portions of the residue elements, parallel to FIG. 2. In this case, separation lines 18 segment many of the intermediate layers completely into separate strips, while the uppermost and lowest layers have U-shaped strips to define the corner interconnections between adjacent elements 16.

Figure 11:
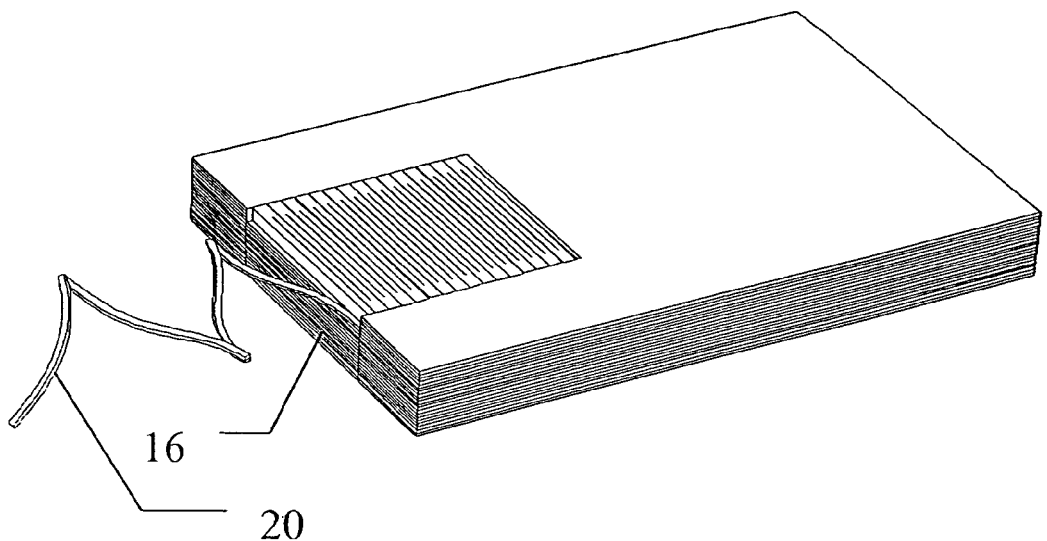
FIG. 11 is an isometric view illustrating the removal of residue material from a block containing a three-dimensional object and residue elements formed according to a tenth aspect of the method of the present invention.
Figure 12:
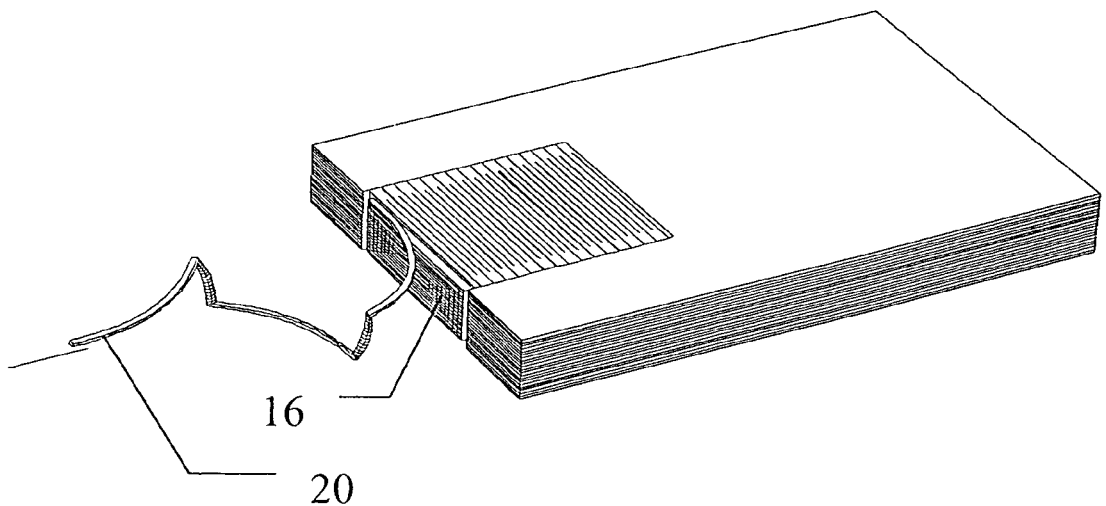
FIG. 12 is an isometric view illustrating the removal of residue material from a block containing a three-dimensional object and residue elements formed according to an eleventh aspect of the method of the present invention.

FIGS. 11 and 12 show implementations in which the vertical residue elements are subdivided into strips in a reciprocally scanning and spiral configuration, respectively. Vertical subdivisions are achieved by superimposed separation lines 18 cut in each of a number of successive layers. Horizontal subdivisions are achieved by selectively preventing attachment between adjacent layers along the required part of one strip. In all respects other than the orientation of residue elements 16, these implementations are fully analogous to the implementations described above.

One further aspect of preferred implementations of the present invention particularly relevant to side-openings is the provision of a handle structure 24 to facilitate removal of a first vertical residue element. Specifically, referring back to FIG. 9A, it will be apparent that separation lines 18 and the selective attachment of layers have been configured in such a manner as to form a handle 24 attached to residue portions which lie within the side opening. Handle 24 is shown here having already been exposed by removal of other portions of the residue regions adjacent to the side opening. As a result, handle 24 is readily accessible for facilitating removal of the residue portions from within the side opening.

Figure 13A:
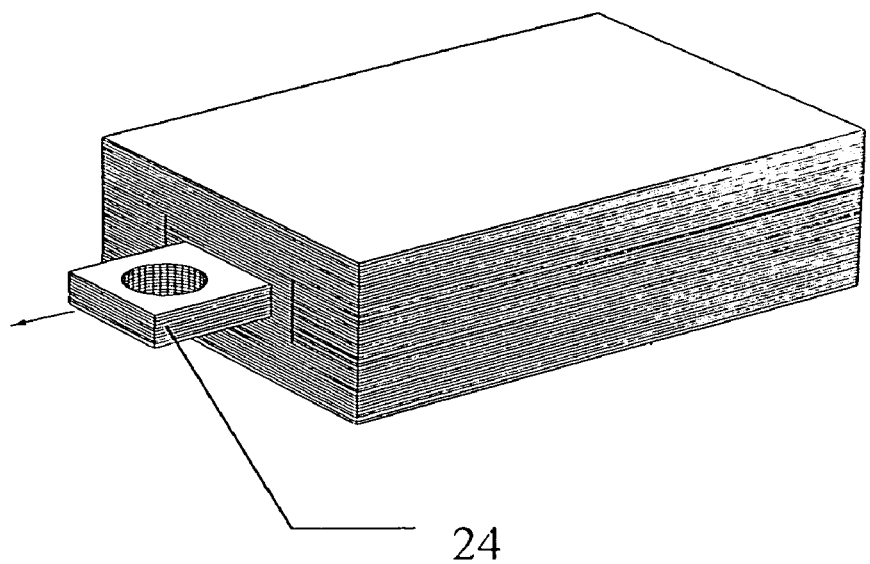
FIGS. 13A and 13B are schematic isometric views illustrating a block containing a three-dimensional object and residue elements formed according to a twelfth aspect of the method of the present invention, prior to and during removal of residue elements, respectively.
Figure 13B:
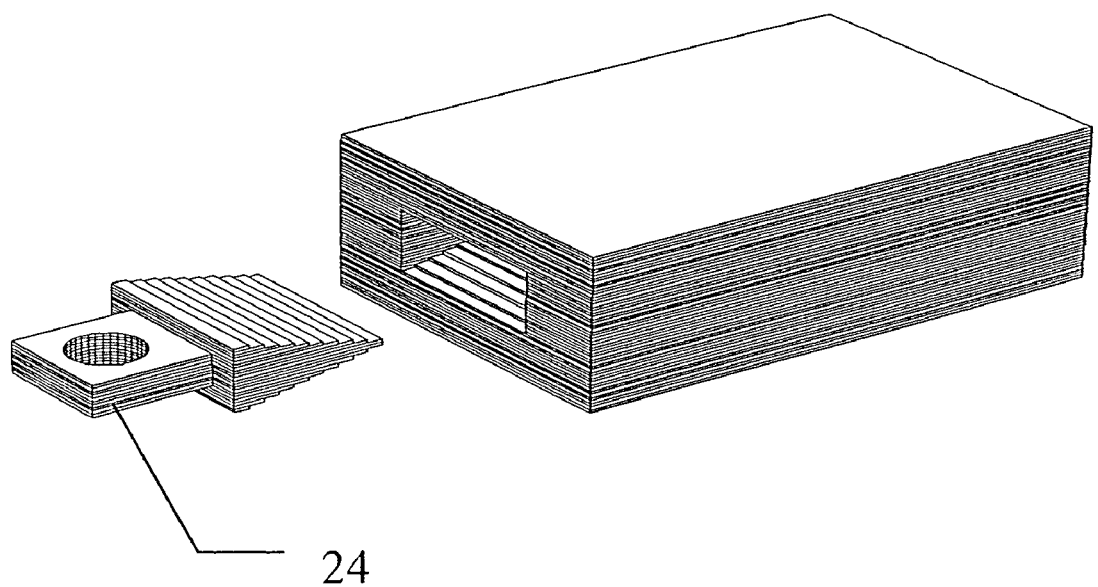

Referring briefly to FIGS. 13A and 13B, it will be noted that, for certain applications in which the side-opening is suitably shallow and/or wedge shaped, provision of a handle 24 may alone be sufficient to facilitate removal of the residue regions from within the opening without the more complicated residue element configurations of FIGS. 9–12.

It was mentioned above that the principles of the present invention are not limited to any particular technology for achieving selective attachment of sheets 12. Nevertheless, it is thought that the use of releasing agent based techniques such as are described in the aforementioned PCT Patent Publication No. WO99/34976 provide many advantages over other known techniques. For this reason, a number of additional features of the present invention specific to such implementations will now be presented. It should be noted that these features are not necessarily limited to use within the context of the methods for facilitating residue removal described above.

Figure 14:
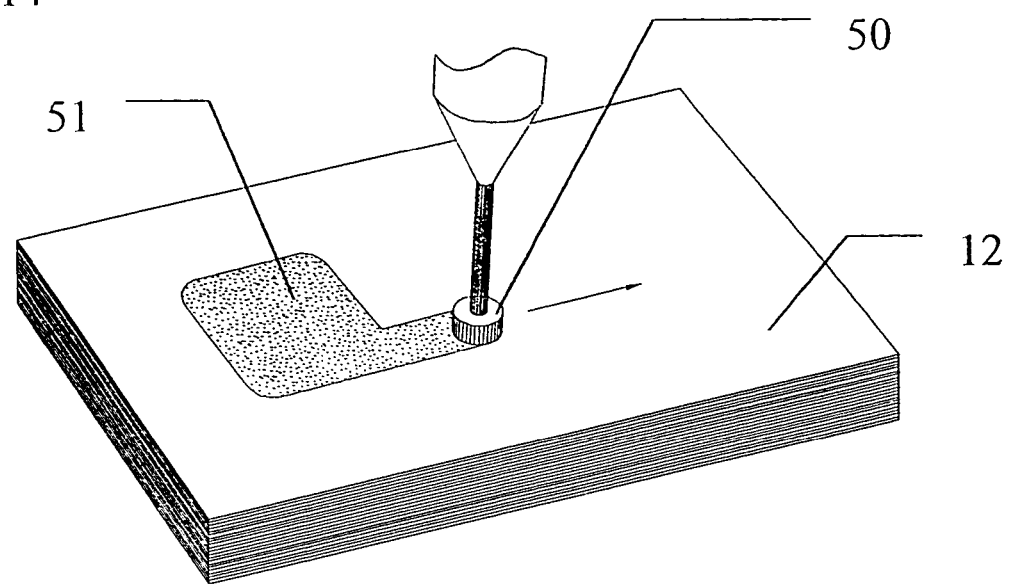
FIG. 14 is a schematic isometric view illustrating an apparatus and method for defining regions of low-adhesion between two layers of sheet material.
Figure 15:
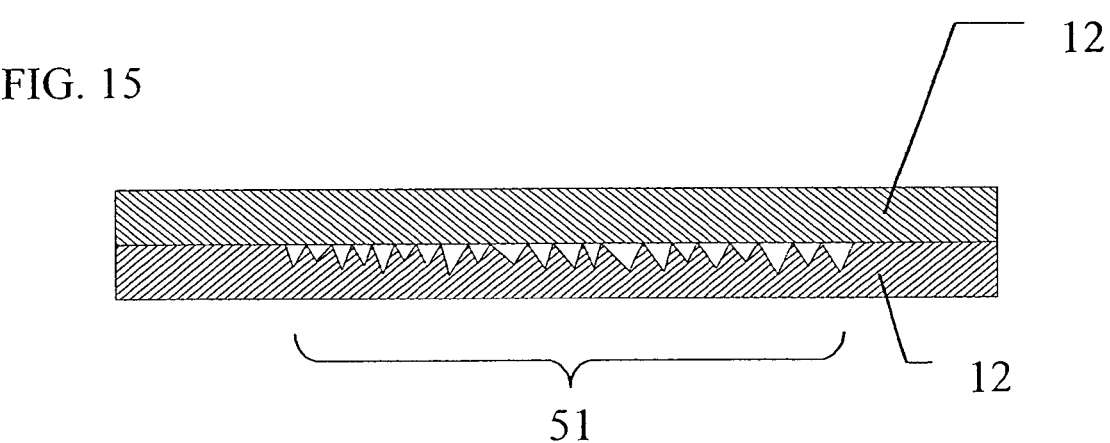
FIG. 15 is a schematic cross-sectional view taken through two adjacent sheets illustrating one mechanism of generating low-adhesion according to the teachings of FIG. 14.

Turning first to FIGS. 14 and 15, these relate to a simple and cost-effective technique through which the releasing-agent properties may be produced by mechanical abrasion of the sheet material itself. Thus, FIG. 14 shows schematically an abrasion tool 50 which is guided over the surface of sheet 12 so as to selectively grind the surface in a region 51. This process has a combined effect of generating powdered material and roughening the surface of the sheet. Depending upon the properties of the sheet material and the adhesive used, the required releasing agent properties may occur by one or a combination of two mechanisms. Firstly, the presence of powdered material from the grinding action is effective to prevent effective adhesion between the sheets. Additionally, or alternatively, where high viscosity adhesives are used, the surface structure of the roughened sheet material offers a greatly reduced contact surface area for the adhesive, thereby greatly reducing the adhesion produced. This latter effect is illustrated schematically in FIG. 15.

Figure 16:
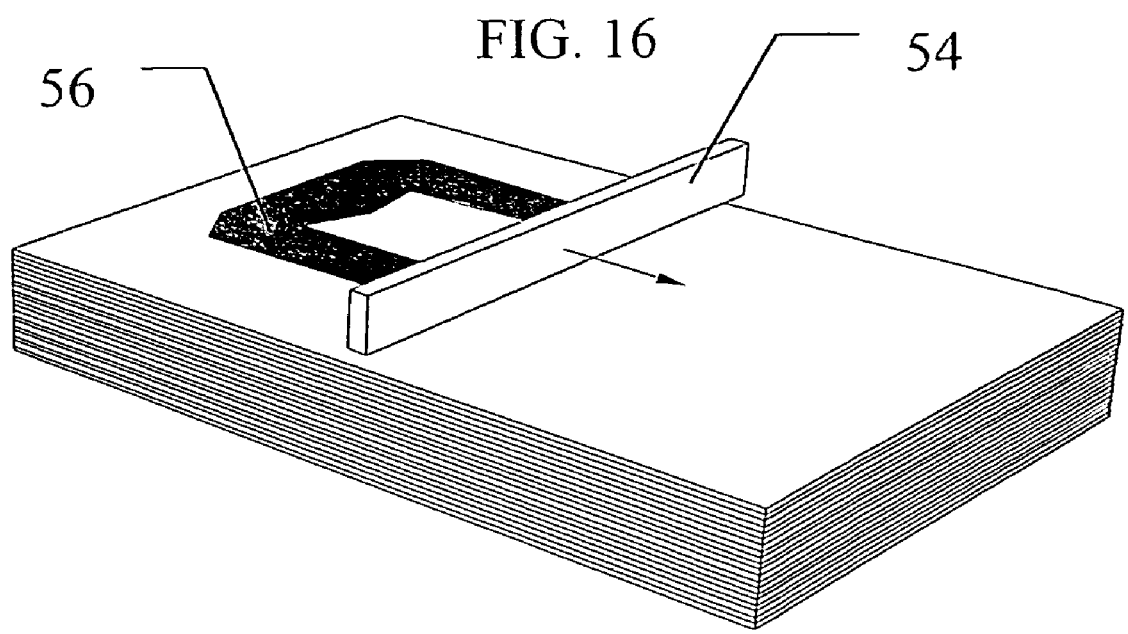
FIG. 16 is a schematic isometric representation of a device and method for selectively applying a fluid releasing agent to a surface of a sheet material.

Turning now to FIG. 16, there is shown an alternative, high speed application technique for a liquid releasing agent. In this case, a wide printing head 54, preferably based on inkjet printing head technology, is used to deliver releasing agent onto the sheet surface in the required pattern 56. In this context, it is important to appreciate that the use of a releasing agent provides a profound advantage over techniques based on selective application of adhesive. Specifically, inkjet structures are based on controlled ejection of drops of liquid through minute apertures. Such structures cannot be used for thick adhesive compositions. It is only by switching to the use of a releasing agent selectively deployed to locally prevent adhesion that it becomes feasible to employ the highly efficient and well developed technology of inkjet-type liquid applicators.

Turning finally to FIGS. 17–19, it will be noted that the conventional approach to constructing three-dimensional objects from layers is to try to achieve complete bonding over the entire area of overlap of the object contours of adjacent layers. In contrast to this approach, one aspect of the present invention provides a technique, and corresponding structures, for achieving controlled flexibility of the final object by defining a pattern of attachment and non-attachment regions within the contour of the object.

Thus, by way of example, this aspect of the invention will be illustrated in the context of the preferred releasing-agent-based implementations of the present invention. Here, a releasing agent may be selectively applied within the contour of the three-dimensional object to provide certain specific mechanical properties. Specifically, FIG. 17 shows an object 10 which is intended to have a flexible portion 52. FIGS. 18 and 19 illustrate two possible distributions of releasing agent which may be used to selectively increase the flexibility of the portion 52.

Specifically, in FIG. 18, the area of portion 52 has had releasing agent applied over its entire area except for an array of dots. As a result, when the adjacent layers of the object are attached, portion 52 exhibits increased flexibility compared to a similar number of layers attached over their entire area. FIG. 19 illustrates a similar concept in which lines of releasing agent have been applied. The latter configuration provides more directional flexibility, tending to facilitate cantilever bending while providing relatively more resistance to twist than the configuration of FIG. 18.

Clearly, this aspect of the invention may equally be implemented in systems based on selective application or activation of glue by causing attachment selectively in the required pattern within the contours of the object.

It will be appreciated that the above descriptions are intended only to serve as examples, and that many other embodiments are possible within the spirit and the scope of the present invention.

What is claimed is:

1. A method for facilitating the removal of residue regions for use in a system for constructing a three-dimensional object by selective attachment of a plurality of sheets of flexible material, each sheet being cut along at least one contour line so as to subdivide the sheet into at least one object forming region corresponding to the shape of a layer of the object bounded by a corresponding contour of the object and at least one residue region not required in the constructed object, at least part of each object forming region being attached to object forming regions of adjacent layers, the method comprising producing selective attachment of at least part of a plurality of the residue regions to the residue regions of adjacent sheets in such a manner as to form, from at least part of the residue regions of a plurality of the sheets, a plurality of residue elements non-rigidly interconnected in a generally Z-fold arrangement such that manual removal of each of said residue elements from the sheet leaves the object portion of the sheet in place and initiates removal of a subsequent one of said residue elements from the subsequent sheet leaving the object portion of the subsequent sheet in place.

2. The method of claim 1, further comprising selectively cutting a plurality of the residue regions of at least some of the sheets along at least one separation line.

3. The method of claim 2, wherein said separation lines and said selective attachment are configured such that said residue elements circumscribe a residue block such that, after removal of said residue elements, said residue block is readily removable.

4. The method of claim 1, wherein each one of at least a group, herein referred to as a first group, of said residue elements assumes a generally flat form extending substantially parallel to the sheets.

5. The method of claim 4, wherein said selective attachment is configured such that each one of said first group of residue elements is formed from a plurality of the residue regions attached to each other over a major part of their area.

6. The method of claim 4, wherein said selective attachment is configured such that adjacent ones of said first group of residue elements are interconnected over no more than a third of their area of overlap.

7. The method of claim 1, further comprising selectively cutting a plurality of the residue regions of at least some of the sheets along at least one separation line, and wherein each one of at least a group, herein referred to as a second group, of said residue elements assumes a generally flat form extending substantially perpendicular to the sheets.

8. The method of claim 7, wherein said selective attachment is configured such that adjacent ones of said second group of residue elements are interconnected over no more than a third of their area of overlap.

9. A method for facilitating the removal of residue regions for use in a system for constructing a three-dimensional object by selective attachment of a plurality of sheets of flexible material, each sheet being cut along at least one contour line so as to subdivide the sheet into at least one object forming region corresponding to the shape of a layer of the object bounded by a corresponding contour of the object and at least one residue region not required in the constructed object, at least part of each object forming region being attached to object forming regions of adjacent layers, the method comprising:
 selectively cutting a plurality of the residue regions of at least some of the sheets along at least one separation line; and
 producing selective attachment of at least part of a plurality of the residue regions to the residue regions of adjacent sheets,
said separation lines and said selective attachment being configured in such a manner as to form, from at least part of the residue regions of a plurality of the sheets, a plurality of residue elements non-rigidly interconnected in a generally Z-fold arrangement such that manual removal of each of said residue elements from the sheet leaves the object portion of the sheet in place and initiates removal of a subsequent one of said residue elements from the subsequent sheet leaving the object portion of the subsequent sheet in place.

* * * * *